United States Patent [19]

Keyes et al.

[11] 4,327,845
[45] May 4, 1982

[54] DISPENSING APPARATUS WITH DISCHARGE ASSISTANT AND ROTARY DISPENSING VALVE

[75] Inventors: Richard M. Keyes, Davis; Stephen W. Schwitters, Rockford; William R. Baillie, Roscoe, all of Ill.

[73] Assignee: Beatrice Foods Co., Chicago, Ill.

[21] Appl. No.: 135,491

[22] Filed: Mar. 31, 1980

[51] Int. Cl.³ .................... G01F 11/02; B65D 88/54
[52] U.S. Cl. ........................ 222/340; 137/625.47; 222/387; 222/449; 222/452; 222/469; 239/331
[58] Field of Search ............... 222/207, 335, 340, 387, 222/449, 452, 469, 481; 184/105 A; 239/329, 331; 137/625.22, 625.47

[56] References Cited

U.S. PATENT DOCUMENTS

| | | | |
|---|---|---|---|
| 720,492 | 2/1903 | Sedberry | 222/335 X |
| 1,673,103 | 6/1928 | Cochin | 137/625.47 |
| 1,979,428 | 11/1934 | Wheeler | |
| 2,337,321 | 12/1943 | Freeman | 137/625.47 |
| 3,189,233 | 6/1965 | Wilson et al. | 222/452 X |
| 3,198,015 | 8/1965 | Smith | 137/625.47 X |
| 3,405,601 | 10/1968 | Clarke | 137/625.47 X |
| 3,715,062 | 2/1973 | Todd et al. | 222/340 |

*Primary Examiner*—Gil Weidenfeld
*Assistant Examiner*—Fred A. Silverberg
*Attorney, Agent, or Firm*—Vernon J. Pillote

[57] ABSTRACT

An apparatus for dispensing measured quantities of viscous material from a pressurized supply source including a measuring cylinder having a spring loaded piston therein and a rotary valve for alternately communicating the measuring cylinder with the supply source and with a discharge outlet. The rotary valve member has axially spaced O-ring seals to inhibit leakage from the ends of the valve member and an inlet seal for sealing against leakage from the pressurized inlet passage in a direction circumferentially of the rotary valve member.

6 Claims, 5 Drawing Figures

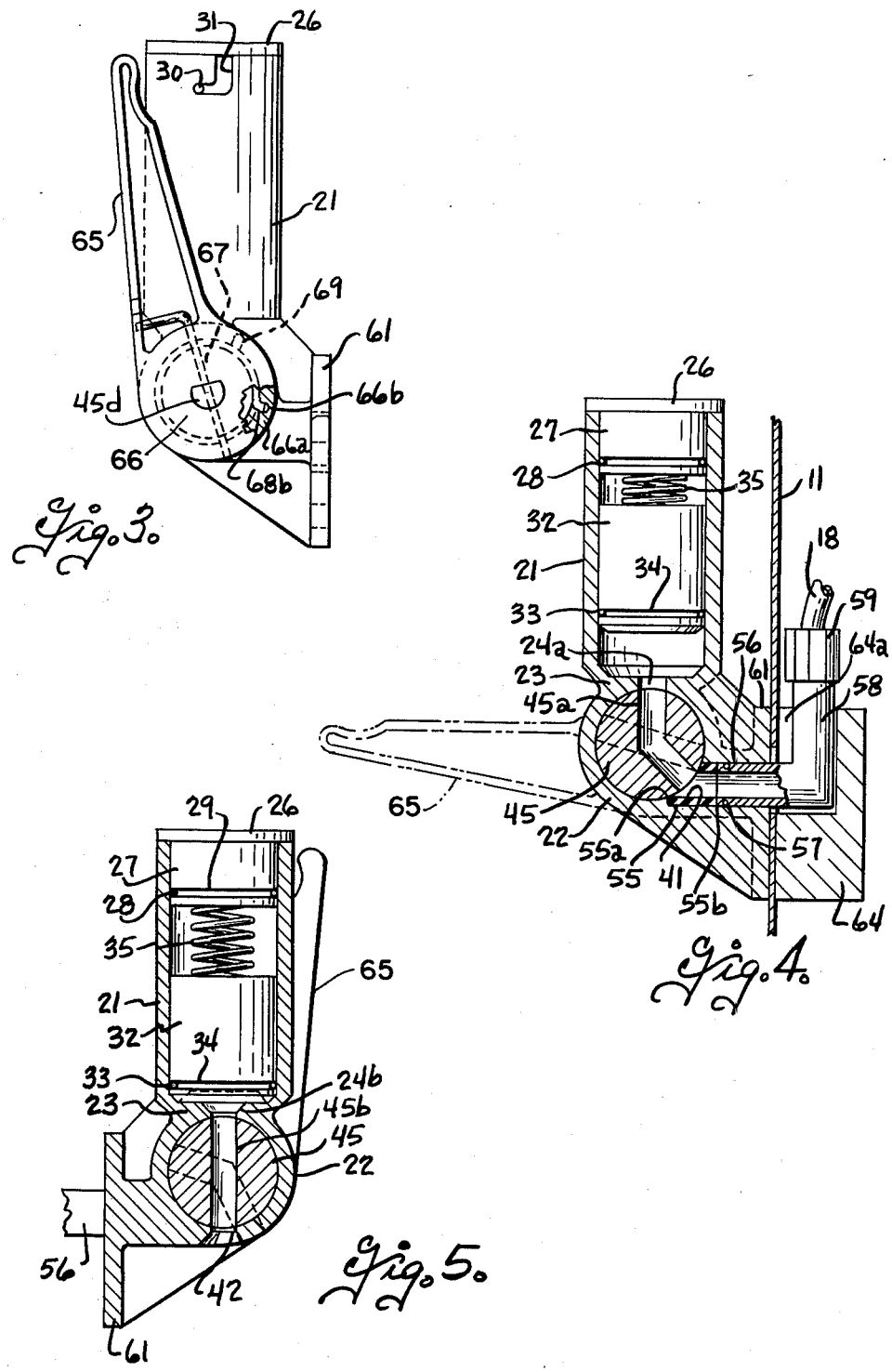

DISPENSING APPARATUS WITH DISCHARGE ASSISTANT AND ROTARY DISPENSING VALVE

BACKGROUND OF THE INVENTION

The present invention relates to dispensing apparatus of the type which are operative to dispense material from a pressurized supply source utilizing a measuring cylinder and valve mechanism operative to alternately communicate the measuring cylinder with the pressurized supply source to fill the measuring cylinder and with a dispensing outlet to dispense a measured quantity of material from the cylinder. The present invention is particularly adapted for use in dispensing syrups and toppings for use on sundaes and the like, which syrups and toppings vary in viscosity and sometimes contain chunks of solid material such as nuts, fruit and the like.

Various objects of the present invention are to provide an apparatus for dispensing measured quantities of viscous material which is capable of handling material of different viscosity without significant leakage; which can be used to dispense materials of different viscosity without causing splashing during dispensing of the less viscous materials; which is of a simple construction that can be easily disassembled, cleaned and reassembled.

These, together with other objects and advantages of the present invention will be more readily understood by reference to the following detailed description, when taken in connection with the accompanying drawings wherein:

FIG. 3 is a side elevational view taken on the plane 3—3 of FIG. 2;

FIG. 4 is a vertical sectional view taken on the plane 4—4 of FIG. 2; and

FIG. 5 is a vertical sectional view taken on the plane 5—5 of FIG. 2.

Figure 1:
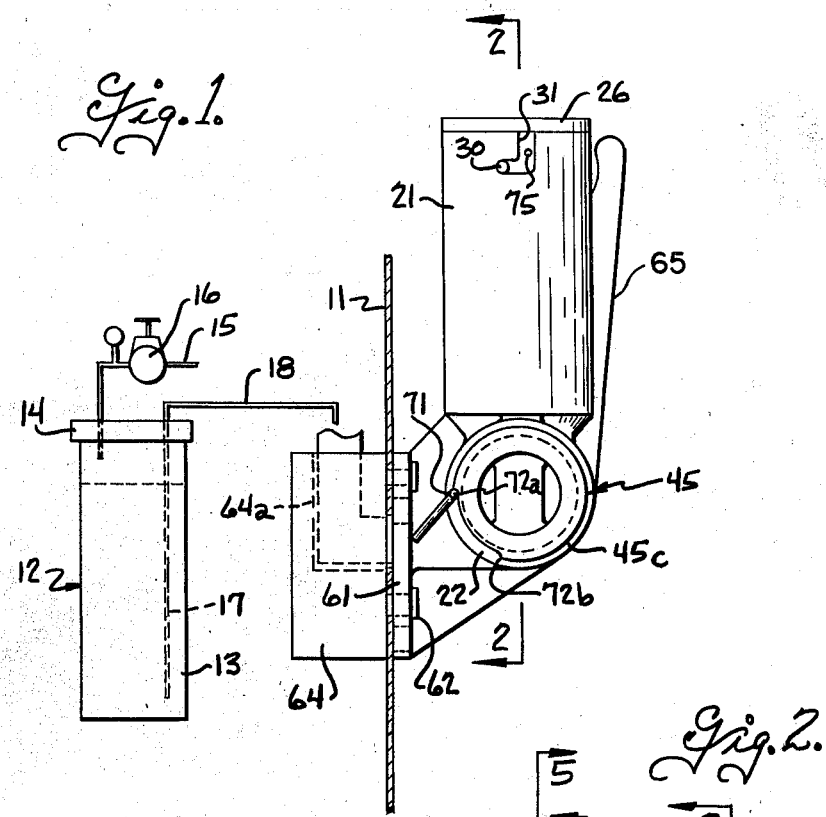
FIG. 1 is a side elevational view showing one end of the dispensing apparatus and diagrammatically illustrating its connection to a pressurized supply source of material to be dispensed.

The dispensing apparatus of the present invention is particularly adapted for use in dispensing syrups and toppings utilized for sundaes and the like from a pressurized source of such material. As shown in FIG. 1, the dispensing apparatus 10 is adapted to be mounted on an upright wall 11 of a cabinet or the like, and connected to a pressurized supply source 12 of the material to be dispensed. The pressurized supply source is conveniently in the form of a container or reservoir 13 adapted to contain a quantity of material to be dispensed, and which container is closed and sealed as by a cover 14 and pressurized as from a tank of pressurized gas such as carbon dioxide (not shown) through a gas pressurizing line 15, and regulator 16 communicating with the top of the tank 13. Liquid material is delivered from the tank through a delivery line 17 that extends from a point adjacent the bottom of the tank, and through a tube or conduit 18 to the inlet of the dispensing apparatus 10.

The dispensing apparatus 10 comprises a housing conveniently molded of a synthetic resin material and which includes a generally upright measuring cylinder 21 and a valve cylinder 22 that extends crosswise at the lower end of the piston cylinder. A wall 23 is provided at the juncture of the valve and measuring cylinders and cylinder passages 24a and 24b are provided in the wall 23 and communicate the measuring cylinder with the valve cylinder.

Figure 2:
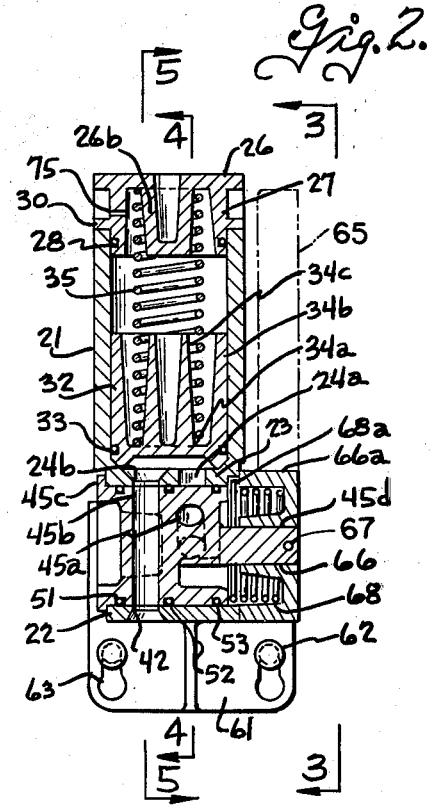
FIG. 2 is a vertical sectional view taken on the plane 2—2 of FIG. 1.

The measuring cylinder 21 has an open upper end and a cap 26 is mounted on the upper end of the piston cylinder to close the same. The cap 26 has a sleeve portion 27 that telescopes into the upper end of the measuring cylinder and an O-ring 28 is seated in a groove 29 in the sleeve portion 27 to seal the interface between the cap and measuring cylinder. The cap is releasably retained in assembled condition on the piston cylinder by lateral lugs 30 that are receivable in bayonet slots 31 on the measuring cylinder. A piston 32 is slidable in the cylinder 21 and an O-ring 33 is mounted in a groove 34 in the cylinder to slidably seal the interface between the piston and measuring cylinder. As best shown in FIG. 2, the piston has a head 34a at its lower end and an upwardly extending skirt portion 34b and a coil type compression spring 35 is interposed between the head of the piston and the cap 26 to yieldably urge the piston downwardly. A spring guide boss 34c is preferably provided on the piston to extend internally of the spring to center and guide the same and, similarly, a spring guide boss 26b is conveniently provided on the cap to also center and guide the spring.

The valve cylinder 23 is open at both ends and the valve cylinder has inlet passage 41 (FIG. 4) and a discharge passage 42 (FIGS. 2 and 5) extending therethrough and angularly spaced from each other. A generally cylindrical rotary valve member 45 is disposed in the valve cylinder and has transfer passages 45a and 45b operative in a first rotary position of the valve member to communicate the supply inlet 41 with the measuring cylinder and in a second rotary position to the valve member, to communicate the measuring cylinder with dispensing outlet 42. As best shown in FIG. 2, the cylinder passages 24a and 24b are axially spaced apart in a direction lengthwise of the valve cylinder. The inlet passage 41 is aligned in a direction transversely of the valve cylinder with the cylinder passage 24a, but is angularly spaced therefrom. The outlet passage 42 is aligned in a direction axially of the valve cylinder with the cylinder port 24b, but is also angularly spaced therefrom. The outlet passage 42 is preferably disposed vertically below the cylinder passage 24b so that the transfer passage 45b can be a straight diametrically extending passage in the valve member to minimize the likelihood that chunks of material will become hung up in the passage during dispensing. Inlet passage 41b is preferably arranged to communicate with the valve cylinder adjacent the lower rear portion thereof as shown in FIG. 4 so that the transfer passage 45a is only slightly angulated as shown in FIG. 4.

The rotary valve member 45 is also conveniently molded of synthetic resin material. In order to minimize machining operations, the valve member is made so as to have a relatively loose fit in the valve cylinder and a plurality of O-rings 51, 52, and 53 are mounted in grooves at spaced locations along the valve member to provide a seal between the valve member and valve cylinder at locations spaced axially outwardly from the transfer passages 45a and 45b, and also at a location intermediate the transfer passages 45a and 45b. Thus, the O-ring seals inhibit leakage adjacent both ends of the rotary valve member and also inhibit leakage between the transfer passages 45a and 45b. The material being dispensed is continuously under pressure at the inlet port 41 and, in order to inhibit leakage of material in a direction circumferentially of the valve member, a resilient inlet seal member 55 (FIG. 4) is provided for engaging the periphery of the rotary valve member around the inlet passage. The inlet seal member 55 is a tubular member of resilient material such as rubber or the like, and is disposed in the inlet passage 41 and has one end 55a, shaped to conform to the periphery of the rotary valve member to seal the same. The other end 55b of the inlet seal member is shaped to engage a spud 56 that is slidable in the inlet passage 41. As best shown in FIG. 4, the spud 56 is also sealed to the inlet passage as by an O-ring 57 mounted in a groove in the spud. The spud 56 forms a part of an inlet fitting 58 which is connected as through a coupling 59 to the syrup supply line 18.

The housing of the dispensing apparatus also includes an integral mounting flange 61 and the flange is conveniently mounted on the upright wall 11 of the cabinet as by headed pins 62 that are receivable in bayonet slots 63 in the flange. The fitting 58 and spud 56 are mounted on the cabinet in such a manner as to allow limited vertical movement of the spud during assembly of the housing on the cabinet. As shown in FIG. 4, the fitting 58 is mounted in a slot 64a in a block 64 at the rear of the cabinet wall 11 for limited vertical movement relative to the cabinet wall, while the block restrains endwise movement of the spud 56. In this manner, the dispensing housing can be pressed rearwardly to press the spud 56 into the inlet passage 41, and then shifted downwardly after the headed pins 62 have passed into the bayonet slots 63.

The rotary valve 45 has a flange 45c at one end arranged to engage one end of the valve cylinder 23 and a shaft 45d (FIG. 2) extending axially from the other end. A handle 65 is attached to the shaft for turning the valve member between its first and second positions. The handle has a hub 66 that slidably and non-rotatably receives the end of the valve shaft 45d and a means such as a pin 67 is provided for securing the handle hub to the shaft. The hub also has an annular skirt portion 66a spaced outwardly from the hub and extending toward the valve cylinder and terminating in an end face that engages the end of the valve cylinder. Thus, when the handle is assembled on the valve member, the valve member is constrained against movement in one direction by the flange 45c on the valve member and in the other direction by the skirt portion 66a of the hub 66. A means is advantageously provided for normally biasing the handle and valve member to its first position. This means comprises a coil type torsion spring 68 that is disposed inside the skirt portion 66a of the hub and which spring has outwardly extending end portions 68a and 68b. One end portion 68a is adapted to be received in a notch 69 in the end of the valve cylinder, and the other end portion 68b is adapted to be received in a groove 66b formed in the inner surface of the skirt portion 66a. The spring is pretensioned during assembly of the handle and valve member on the housing, in a manner described more fully hereinafter, so as to normally bias the valve member and handle to its first position shown in FIGS. 2, 3, and 5. More particularly, the coil type torsion spring is inserted into the skirt portion 66a of the hub, with the end 68b of the spring disposed in the groove 66b. The end portions 68a and 68b of the spring 66 may, for example, be disposed 180° apart when the spring is not distended and the handle is then moved in a clockwise direction from the position shown in FIG. 3 until the end portion 68a of the spring registers with the notch 69 in the end of the valve housing. The handle can then be moved back to the position shown in FIG. 3 against the bias of the spring. A stop pin 71 (FIG. 1) is adapted to be inserted into a hole in the other end of the valve cylinder, and the flange 45c on the valve member has a cutaway sector to receive the pin 71 and to provide angularly spaced stops 72a and 72b for limiting movement of the valve member and handle from its first position shown in FIGS. 1, 2, 3 and 5, to its second position shown in FIG. 4.

In order to minimize the number of different parts which must be handled during assembly and disassembly of the dispensing apparatus, the measuring cylinder and valve cylinder are advantageously made of the same diameter and, similarly, the valve member, piston member, and the sleeve portion 27 of the cap are also made of the same diameter. This enables use of the same size O-rings for rings 28, 33, 51, 52 and 53.

From the foregoing it is thought that the construction and operation of the dispensing apparatus will be readily understood. In use, the spring 68 normally urges the handle 65 to its raised position and the valve member to its first position as shown in FIGS. 1, 2, 3 and 5. When the valve member is in its first position, the transfer passage 45a is out of registry with the inlet passage 41 and the cylinder passage 24a while the transfer passage 45b registers with the cylinder passage 24b and the outlet passage 42 to allow discharge of the material from the measuring cylinder. O-rings 51, 52 and 53 seal the interface between the rotary valve member and valve cylinder to inhibit flow in a direction axially of the valve member and, when the valve member is in its first position, the inlet seal member 41 engages the cylindrical periphery of the valve member at a location angularly offset from the transfer passage 45a, to block flow of material from the inlet in a direction circumferentially of the valve member. When the handle 65 is moved downwardly to the position shown in FIG. 4, the valve member is moved to its second position in which the transfer passage 65a communicates the inlet passage 41 with the cylinder passage 24a, while the transfer passage 45b is out of registry with the cylinder passage 24b and outlet passage 42. Material under pressure from the supply source 12 is delivered from the inlet passage through transfer passage 45a and into the measuring cylinder to raise the piston therein against the bias of spring 35, until the upper end of the piston engages the cap, which forms a stop for the piston. The air in the measuring cylinder above the piston is vented to atmosphere through the restricted vent 75 (FIGS. 1 and 2) and this limits the rate of upward movement of the piston during filling of the measuring cylinder. When the valve member is thereafter moved back to its first position the flow of material into the measuring cylinder is shut off and the measured quantity of material in the measuring cylinder is discharged through the transfer passage 45b. During discharge of material, the restricted vent 75 also limits the rate of air flow into the measuring cylinder above the piston and controls downward movement of the piston to inhibit splashing of the product as it is dispensed.

The dispensing apparatus can be readily disassembled for cleaning. It is removed from the cabinet by first lifting the dispensing apparatus until the headed pins 62 register with the lower ends of the bayonet slots 63, and thereafter pulling the dispensing apparatus laterally away from the cabinet to disengage the pins from the bayonet slots and to disengage the spud 56 from the inlet passage. The handle is removed from the valve member by removing the pin 67 after which the valve member can be pulled out of the valve cylinder. The measuring cylinder cap 26 is removable from the measuring cylinder by turning and lifting the same to disengage the pins 30 from the bayonet slots 31, and the piston and spring can thereafter be removed for cleaning through the open upper end of the cylinder.

The embodiments of the invention in which an exclusive property or privilege is claimed are defined as follows:

1. A dispensing apparatus for dispensing measured quantities of material from a pressurized supply source, the dispensing apparatus comprising a housing including a measuring cylinder having an end wall at one end and open at its other end and a valve cylinder extending crosswise of said one end of said measuring cylinder and open at both ends, a piston slidable in said measuring cylinder, a cap mounted on said open other end of the measuring cylinder, and a coil compression spring interposed between the cap and the piston yieldably urging said piston toward said one end of the measuring cylinder, said one end wall of said measuring cylinder having cylinder passage means therein communicating said measuring cylinder with said valve cylinder, said valve cylinder having an inlet passage therein and a discharge passage therein, means connecting said inlet passage with said supply source, a rotary valve member in said valve cylinder having transfer passage means therein operative in a first rotary position of the valve member to communicate the inlet passage with the cylinder passage means to pass material from the inlet passage to the cylinder passage means and operative in a second rotary position of the valve member to communicate the cylinder passage means with the discharge passage, said valve member having a flange on one end engageable with one end of the valve cylinder and a shaft extending axially from its other end, an operating handle for moving the valve member between said first and second positions, said handle having a hub at one end and means for non-slidably and non-rotatably connecting the hub to said shaft on the valve member, said hub having an annular skirt portion extending toward the valve cylinder and terminating in an end face engageable with the other end of the valve cylinder, and a coil type torsion spring disposed within said skirt portion and having one end anchored to the hub and the other end anchored on the valve cylinder for yieldably urging the rotary valve member to one of said positions thereof.

2. A dispensing apparatus according to claim 1 wherein said cylinder passage means includes first and second cylinder passages spaced apart in a direction axially of the valve cylinder, said transfer passage means includes first and second transfer passages, said first transfer passage being arranged to communicate the inlet passage with the first cylinder passage in said first rotary position of the valve member and said second transfer passage being arranged to communicate the second cylinder passage with the outlet passage in said second rotary position of the valve member.

3. A dispensing apparatus according to claim 2 including first and second end O-rings engaging the valve cylinder axially outwardly of said first and second cylinder passages and an intermediate O-ring engaging the valve cylinder intermediate said first and second cylinder passages.

4. A dispensing apparatus according to claim 1 wherein said means connecting said inlet passage with said supply source includes a spud slidable into said inlet passage, a resilient inlet passage seal member comprising a tubular resilient body slidable in said inlet passage and having one end shaped to engage the end of said spud and the other end shaped to engage the periphery of the rotary valve member.

5. A dispensing apparatus according to claim 1 wherein said piston and said valve member have the same outer diameter, said piston having an O-ring seal disposed in a groove thereon for sealingly engaging the piston cylinder, the valve member having axially spaced O-ring seals disposed in grooves axially outwardly of the transfer passage means for sealingly engaging the valve cylinder at axially spaced locations therealong, the O-ring seals on the valve member and piston member being of the same size.

6. A dispensing apparatus according to claim 1 wherein said cap has a portion extending into said other end of the measuring cylinder, said piston and said cap and said valve member having the same outer diameter, said piston having an O-ring seal disposed in a groove thereon for sealingly engaging the measuring cylinder, the portion of the cap having an O-ring seal thereon for engaging the measuring cylinder, the O-ring seals on the valve member, and piston member and cap being of the same size, and restricted vent means in the cap for venting the piston cylinder to atmosphere.

* * * * *